United States Patent
Gustaveson, II (10) Patent No.: US 10,302,227 B1
(45) Date of Patent: May 28, 2019

(54) CABLE ORGANIZING APPARATUS AND SYSTEM

(71) Applicant: Gust Marketing, LLC., Draper, UT (US)

(72) Inventor: Ronald Glen Gustaveson, II, Draper, UT (US)

(73) Assignee: Gust Marketing, LLC, Draper, UT (US)

( * ) Notice: Subject to any disclaimer, the term of this patent is extended or adjusted under 35 U.S.C. 154(b) by 0 days.

(21) Appl. No.: 15/858,186

(22) Filed: Dec. 29, 2017

(51) Int. Cl.
  *F16L 3/08* (2006.01)
  *F16L 3/13* (2006.01)
  *F16B 1/00* (2006.01)

(52) U.S. Cl.
  CPC .......... *F16L 3/13* (2013.01); *F16B 1/00* (2013.01); *F16B 2001/0035* (2013.01)

(58) Field of Classification Search
  CPC .......................... F16B 2001/0035; A45F 5/02
  See application file for complete search history.

(56) References Cited

U.S. PATENT DOCUMENTS

| | | | | |
|---|---|---|---|---|
| 9,920,877 | B2* | 3/2018 | Conti | A47G 23/02 |
| 2005/0111810 | A1* | 5/2005 | Giraud | G02B 6/4452 |
| | | | | 385/135 |
| 2007/0099681 | A1* | 5/2007 | Kielland | A45F 5/02 |
| | | | | 455/575.1 |
| 2007/0125919 | A1* | 6/2007 | Hopkins | A47F 5/0043 |
| | | | | 248/205.3 |
| 2009/0094799 | A1* | 4/2009 | Ashel | F16L 3/13 |
| | | | | 24/129 R |
| 2013/0214101 | A1* | 8/2013 | Daniel | F16L 3/02 |
| | | | | 248/75 |

OTHER PUBLICATIONS

Philonext TedGem 2018 Upgraded Magnetic Clips, Desktop Cord Management, Multipurpose Organizer with 3 Buckles and 2 Bases for Cell Phone Cable, Dark Gray. Amazon [online]. TedGem Direct Sep. 15, 2017 [retrieved on Feb. 2, 2019],<URL: https://www.amazon.com/Upgraded-Magnetic-Management-Multipurpose-Organizer/dp/B07B4SFXW7/ref=sr_1_4?ie=UTF8&&qid=1545944112&sr=8-4&keywords=magnetic+cable+organizer>.

Fcoson Magnetic Cable Clips Organizer Phone Charger Cord Management Holder for Headphone Wire USB Charging Cables Wood Color. Amazon [online]. Fcoson [retrieved on Feb. 12, 2019]<URL: https://www.amazon.com/Fcoson-Magnetic-Organizer-Management-Headphone/dp/B0784PZT6K/ref=sr_1_31?e=UTF8&&qid=1545944816&sr=8-31&keywords=magnetic+cable+organizer>.

(Continued)

*Primary Examiner* — Amy J. Sterling
(74) *Attorney, Agent, or Firm* — Workman Nydegger (57) ABSTRACT

Embodiments are directed to a cable organizing apparatus and system. In one scenario, a cable organizing apparatus includes a support structure including an inner surface that is attachable to a specified object. The support structure further includes an outer surface that has multiple mounting points at which cable fasteners are mounted to the support structure. The cable organizing apparatus also includes cable fasteners configured to hold cables in a specified position. The cable fasteners mount to the outer surface of the support structure. The cable fasteners include a clip and an attaching means for attaching the cable fasteners to the support structure. The outer surface of the support structure may be made of a printable material.

22 Claims, 11 Drawing Sheets

(56) References Cited

OTHER PUBLICATIONS

Cord Clips, Baseus Magnetic Cable Clip 3-Pack Desktop Cord Holder & Hider, Charging Cable Drop Organizer & Management System for TV PC for Mobile Phone USC Data Cable Organizer for Usc Charger Cable. Amazon [online]. Baseus [retrieved on Feb. 12, 2019] <URL: https://www.amazon.com/Baseus-Magnetic-Charging-Organizer-Management/dp/B07CKK6P6C/ref=sr_1_59?ie=UTF8&qid=1545944955&sr=8-59&keywords=magnetic+cable+organizer>.

Sinjmoru Magnetic Cable Clips, Multipurpose Cable Management Organazier for car and office supplies Self Adhesive Clip for Type C, Iphone and Micro USB Cable. Magnetic cable holder, black 3 pack. Amazon [online]. [retrieved on Feb. 12, 2019] <URL: https://www.amazon.com/dp/B01DPGW22Y/ref=sxbs_sxwds-stppvp_1?of_rd_p=d45777d6-4c64-4117-8332-1659db52e64f&pd_rd_wg=4GNnJ&pf_rd_r=TVZ3MNWAS72YSC37F4A6&pd_rd_i=B01DPGW22Y&pd_rd_w=V9wh7&pd_rd_r=5e651ce5-9c54-45bf-9280-18959f6e20ec&ie=UTF8&qid=1545944347&sr=1;>.

CSHope Magnetic Cable Holder Multipurpose Cable Clips Organizer Cord Management for All Wires. Amazon [online]. CSHope [retrived on Feb. 12, 2019]<URL: https://www.amazon.com/CSHope-Magnetic-Multipurpose-Organizer-Management/dp/B07F9JVSSS/ref=sr_1_196?ie=UTF8&qid=1545944577&sr=8-196&keywords=cable+organizer;>.

Cable Management Magnetic Cable Clip, ChuangSiAo Magnetic Cable Organizer Multipurpose Cable Clips for Power Wires, Charging Cables, USB Cords, Car Charger Cord Organizer, Headphones Wires, Washing Glue. Amazon [online]. [retrieved on Feb. 12, 2019] <URL: https://www.amazon.com/ChuangSiAo-Management-Protector-Protection-Headphones/dp/B07CN3R21T/ref=sr_1_23?ie=UTF8&qid=1545944816&sr=8-23&keywords=magnetic+cable+organizer>.

Exea Seikosangyo Co, Ltd. EC-204 Cable Management Magnetic Organizer Carbon Looks Design. Amazon [online]. EXEA [retrieved on Feb. 12, 2019] <URL: https://www.amazon.com/EXEA-SEIKOSANGYO-EC-204-Management-Organizer/dp/B079TSFDGJ/ref=sr_1_123?ie=UTF8&qid=1545945071&sr=8-123&keywords=magnetic+cable+organizer>.

Mthinkor Magnetic Cable Clips, PU Leather Magnetic Cable Organizer with 3 Cable Clips for Power Wires, Charging Cables, USB Cords, Audio Cables, Headphones Wires (Leather-Black). Amazon [online]. Mthinkor [retrieved on Feb. 12, 2019] <URL: https://www.amazon_com/Mthinkor-Magnetic-Organizer-Headphones-Leather-Black/dp/ B07DBZX247/ref=sr_1_69?ie=UTF8&qid=1545944984&sr=8-69&keywords=magnetic+cable+organizer>.

GUYO Magnetic Cable organizer wire winder USB/Lighting Cable clip holder sort out tool Desktop Workstation. Amazon [online]. GUYO [retrieved on Feb. 12, 2019] <URL: https://www.amazon.com/GUYO-Magnetic-organizer-Lighting-Workstation/dp/B07BMP19LT/ref=sr_1_52?ie=UTF8&qid=1545944955&sr=8-52&keywords=magnetic+cable+organizer>.

Magnetic Cable Clips Desktop Cable Organizer with 3 Cable Buckles and 1 Bases for USB Charging Cord Laptop PC Headphones or Car Cable Holder (White). Amazon [online]. Seabaras [retrieved on Feb. 12, 2019] <URL: https://www. amazon.com/Magnetic-Desktop-Organizer-Charging-Headphones/dp/B077YJB3B8/ref=sr_1_32?e=UTF8&qid=1545944816&sr=8-32&keywords=magnetic+cable+organizer>.

Lead Trend Magnetic Cable Clips+Magnetic Adaptable Base—Cord Holder & Wire Organizer Management for Clutter-Free Office, Cubicle, Car, Nightstand, Desk Accessories Cable Keeper (Black). Amazon [online]. Lead Trend [retrieved on 2019-02-12] <URL: https://www.amazon.com/Lead-Trend-Magnetic-Cable-Adaptable/dp/B07LBC1JFH/ ref=sr_1_70?ie=UTF8&qid=1545944984&sr=8-70&keywords=magnetic+cable+organizer>.

Screen captures from YouTube video clip entitled "Review: Ultimate Cable Management Solution—T'Up," 3 pages, uploaded on May 30, 2017 by user "DB Tech". Retrieved from Internet on Feb. 12, 2019: <https://www.youtube.com/ watch?v=McAZqcBoER4>.

Screen captures from YouTube video clip entitled "Bcase Magnetic Cable Management Strip/Clip review," 3 pages, uploaded on Sep. 2, 2016 by user "Eric Melgar". Retrieved from Internet on Feb. 12, 2019: <https://www.youtube.com/watch?v=bskZdtjkzIc>.

\* cited by examiner

CABLE ORGANIZING APPARATUS AND SYSTEM

BACKGROUND

Computers, laptops, phones, tablets and other devices are often attached to peripherals or other devices using cords. For example, users plug headphones into mobile devices, they plug mobile devices into projectors or televisions, or they may plug mice into laptops for easier navigation through user interfaces. Regardless of the reason, many devices, including PCs and televisions often have cords or wires running from one connection to another. These wires and cords often get tangled and create an unsightly mess behind the devices. Existing solutions, including Velcro straps and plastic tightening straps, are unsightly and/or do not allow for flexible repositioning.

BRIEF SUMMARY

Embodiments described herein are directed to a cable organizing apparatus and system. In one embodiment, a cable organizing apparatus includes a support structure including an inner surface that is attachable to a specified object. The support structure further includes an outer surface that has multiple mounting points at which cable fasteners are mounted to the support structure. The cable organizing apparatus also includes cable fasteners configured to hold cables in a specified position. The cable fasteners mount to the outer surface of the support structure. The cable fasteners include a clip and an attaching means for attaching the cable fasteners to the support structure. The outer surface of the support structure may be made of a printable material.

In another embodiment, a cable organizing system is provided. The cable organizing system includes a base that is attachable to an object. The cable organizing system also includes a shell structure that is fastened to the base. The shell structure has mounting points at which clips are mounted to the shell structure. The cable organizing system further includes one or more clips configured to route cables positioned in the object's vicinity. The clips are detachably mounted to at least one of the mounting points of the shell structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to a cable organizing apparatus and system. In one embodiment, a cable organizing apparatus includes a support structure including an inner surface that is attachable to a specified object. The support structure further includes an outer surface that has multiple mounting points at which cable fasteners are mounted to the support structure. The cable organizing apparatus also includes cable fasteners configured to hold cables in a specified position. The cable fasteners mount to the outer surface of the support structure. The cable fasteners include a clip and an attaching means for attaching the cable fasteners to the support structure. The outer surface of the support structure may be made of a printable material.

In another embodiment, a cable organizing system is provided. The cable organizing system includes a base that is attachable to an object. The cable organizing system also includes a shell structure that is fastened to the base. The shell structure has mounting points at which clips are mounted to the shell structure. The cable organizing system further includes one or more clips configured to route cables positioned in the object's vicinity. The clips are detachably mounted to at least one of the mounting points of the shell structure.

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc. similar or equivalent to those described herein can be used in the practice of the present disclosure, only certain exemplary methods, materials, components, etc. are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct association between two components or, where appropriate, an indirect association with one another through intervening or intermediate components. In contrast, when a component is referred to as being "directly coupled", "directly attached", "directly connected," and/or "directly joined" to another component, no intervening elements are present or contemplated.

Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number.

In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment. The headings used herein are for organizational purposes only and are not meant to be used to limit the scope of the description or the claims.

Figure 1A:
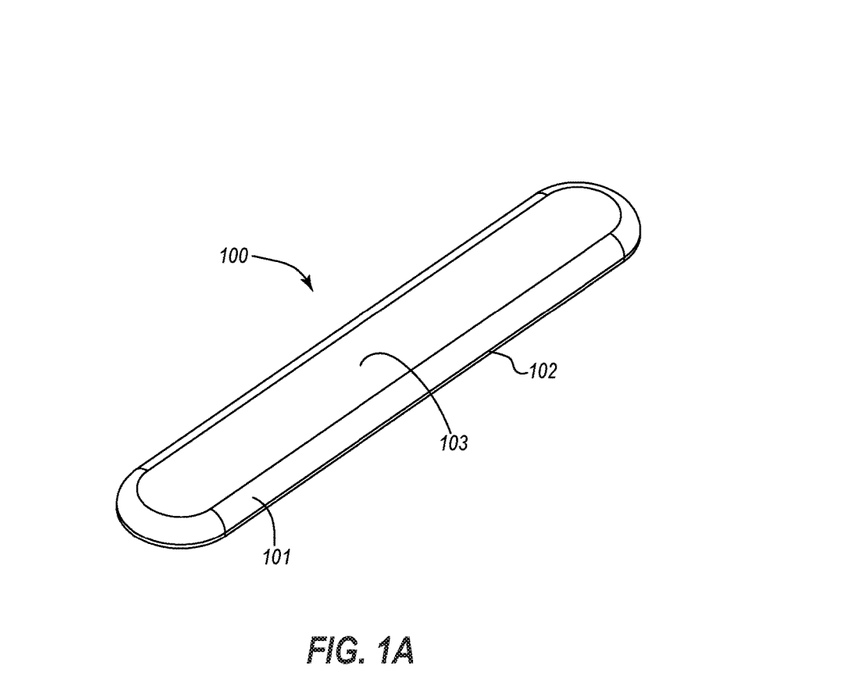
FIG. 1A illustrates a front perspective view of a cable organizing apparatus.
Figure 1B:
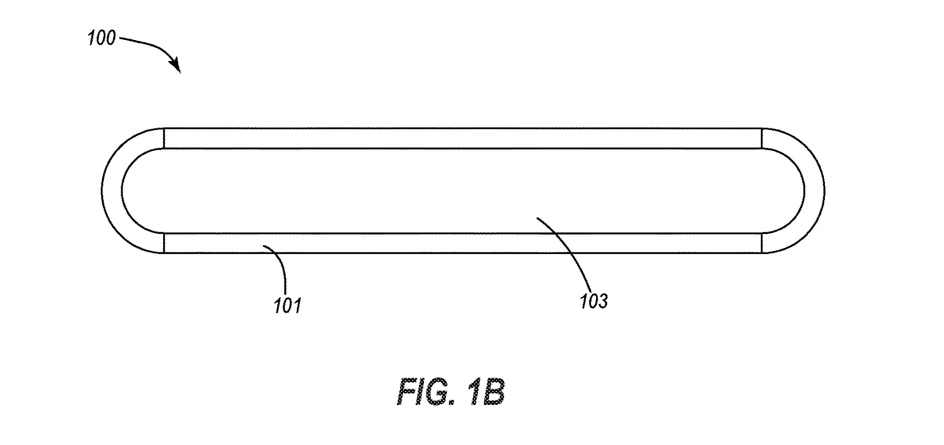
FIG. 1B illustrates a top view of the cable organizing apparatus.

Embodiments described herein are directed to a cable organizing apparatus and system 100. In one embodiment, the cable organizing apparatus 100 includes a support structure 101. The support structure is generally shown in FIGS. 1A-1D. FIG. 1A shows a front perspective view of the support structure 101. The support structure 101 has an inner surface 102 that is more easily seen in the bottom view of FIG. 1C. Furthermore, the support structure 101 has an outer surface 103 that can be seen in the top view of FIG. 1B. FIG. 1D shows a side view that illustrates the support structure and part of the inner surface 102. The support structure, outer surface 103, and inner surface 102 may be of substantially any thickness, and may be formed in substantially any shape.

The support structure 101, the inner surface 102 and the outer surface 103 may each be made of the same material, or may be made of different materials. The support structure 101 may be made of metal, for example, or plastic, ceramic, rubber, or other type of material. Similarly, the inner and outer surfaces (102/103) may be made of metal, plastic, ceramic, rubber, or any type of printable material on which information (including words, colors, shapes, logos, etc.) can be printed. In some cases, the inner surface 102 may include magnets, or may itself be a magnet. Similarly, the outer surface 103 may include magnets or may be a magnet. Thus, the entire outer or inner surface may be magnetic, or only portions thereof may be magnetic. This will be explained in greater detail below.

Each cable organizing apparatus 100 (or "apparatus 100" or "cable organizer" herein) may be cut or molded into substantially any shape. Thus, while an oblong cigar shape is shown in the Figures, it will be recognized by one skilled in the art that the cable organizer may be formed in the shape of a square, circle, rectangle, oval, triangle, star, cube or other shape. The inner and outer surfaces (102/103) may be flat (as shown in FIGS. 1A-1D), or they may have curves, indentations, bumps, outcroppings, or other features. For example, the sides of the support structure 101 and/or the outer surface 103 may have indentations or grooves that serve as grip points where a user's fingers can grip the structure. Other decorative or utilitarian features may be added to the cable organizer. In some cases, these may be sold as add-ons to the cable organizer that allow users to customize the organizer. For instance, companies may wish to add features that are unique to their brand to the cable organizer so that the user remembers the brand. Such cable organizers may be provided to potential customers as promotional items.

Figure 1C:
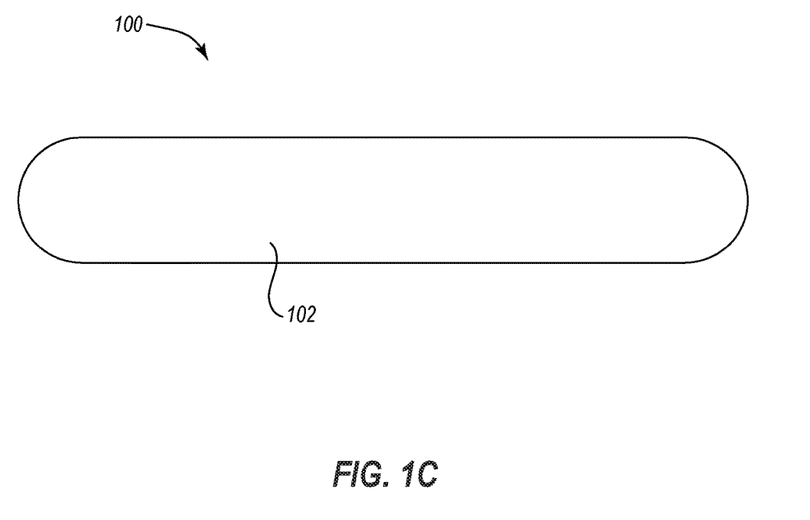
FIG. 1C illustrates a bottom view of the cable organizing apparatus.
Figure 1D:
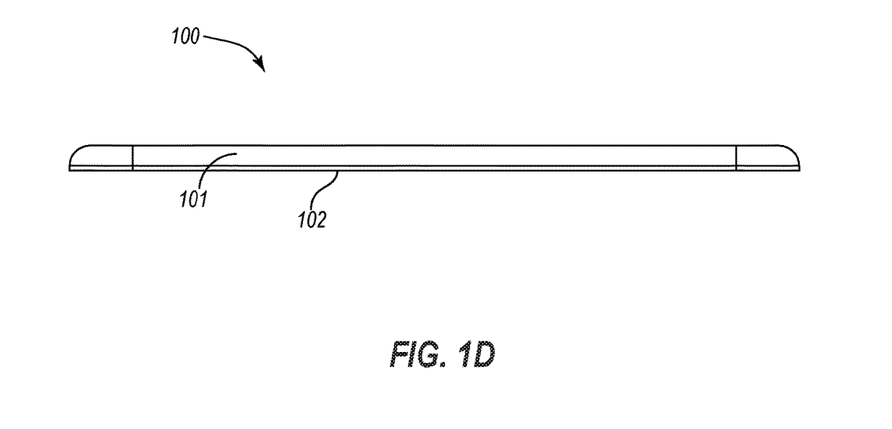
FIG. 1D illustrates a side view of the cable organizing apparatus.

Each cable organizer has an inner surface (e.g. 102), as shown in FIGS. 1A, 1C and 1D). This inner surface 102 is attachable to different objects. The inner surface 102 may include or may itself be an attaching means that attaches the cable organizing apparatus 100 to objects such as PCs, laptops, mobile phones, tablets, televisions or other devices that have or can use cords. The attaching means on the inner surface 102 may be a magnet in one embodiment. In such cases, the inner surface 102 is the attaching means. In other cases, the inner surface 102 may have an adhesive layer applied thereto that bonds the cable organizer to the object. This adhesive may be a permanent adhesive, or a removable/re-sealable adhesive that allows for repeated attachments to different items.

In cases where the inner surface 102 is a magnet (either entirely or partially), the magnet may be a relatively thin magnet (e.g. about 1/32", about 1/16", or about 1/8") that spans the length and width of the inner surface. This thin magnet would be attached to the support structure 101. Or, in other embodiments, the thin magnet may be embedded within the support structure 101, such that the support structure inherently includes the inner surface 102. In other embodiments, multiple smaller magnets may be attached to or embedded in the support structure 101, which cause the inner surface 102 to adhere to an object. These magnets may detachably affix the cable organizing apparatus 100 to an object made of metal or made of another ferrous material. Other attaching means such as Velcro, tape, suction cups, twist ties, nails, screws or other fasteners may be used on the inner surface 102 to secure the support structure 101 to the object. Using any one or more of these attaching means, the cable organizer may be secured to the side, top, bottom, or any other surface of a desired object.

Figure 2A:
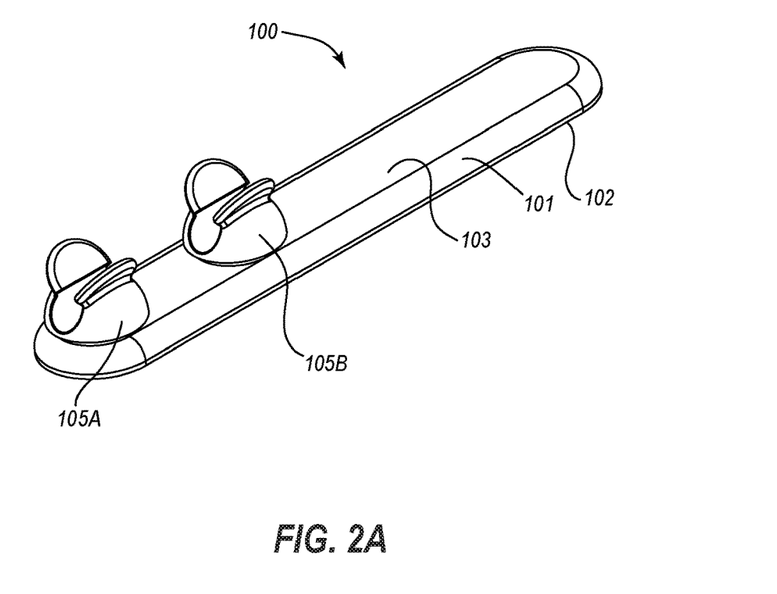
FIG. 2A illustrates a front perspective view of the base with two cable fasteners attached in a first position.

The support structure 101 further includes an outer surface 103 (as shown in FIGS. 1A and 1B) that has multiple mounting points at which cable fasteners may be mounted to the support structure. These mounting points may be at fixed positions, or may be substantially anywhere along the outer surface 103. For instance, as shown in FIG. 2A, cable fasteners 105A and 105B are mounted or attached to the outer surface 103 of the cable organizing apparatus 100. In cases where the entire outer surface 103 is made of ferrous material, magnets in the cable fasteners 105A/105B may magnetically adhere to the outer surface.

Figure 2B:
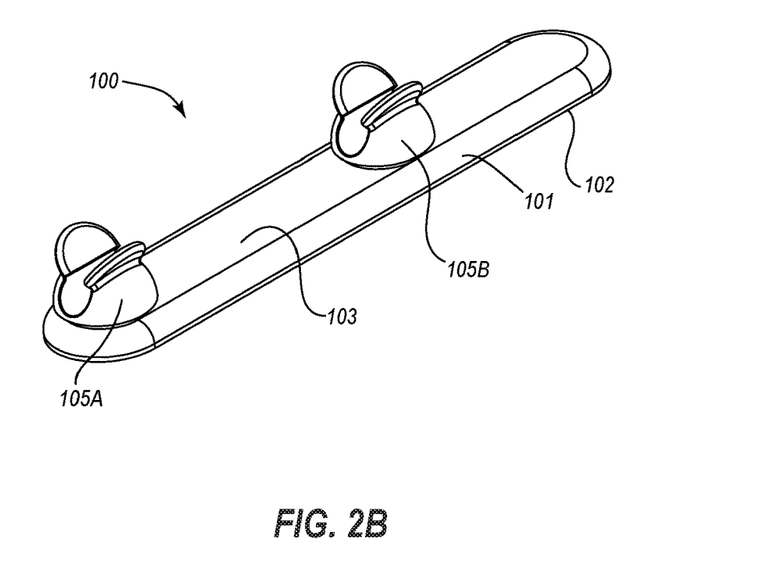
FIG. 2B illustrates front perspective view of the base with two cable fasteners attached in a second position.
Figure 3A:
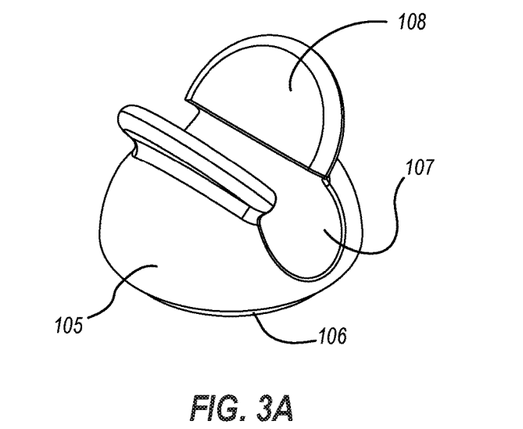
FIG. 3A illustrates a front perspective view of a cable fastener.
Figure 3B:
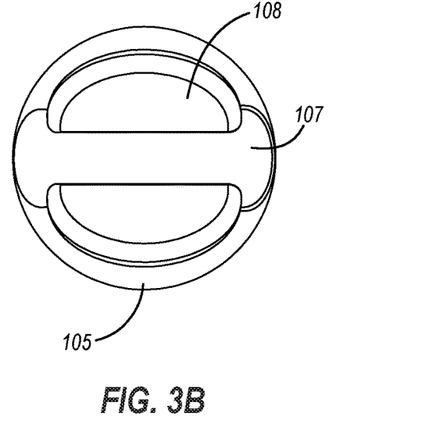
FIG. 3B illustrates a top view of a cable fastener.
Figure 3C:
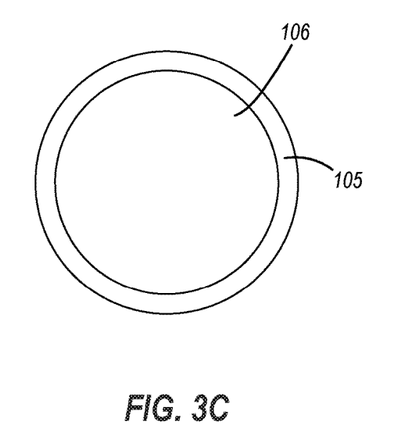
FIG. 3C illustrates a bottom view of a cable fastener.
Figure 3D:
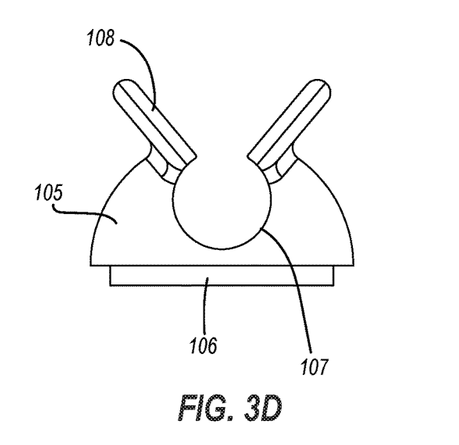
FIG. 3D illustrates a side view of a cable fastener.

Indeed, as shown in FIGS. 3A, 3C and 3D, the cable fastener 105 may have a magnet 106 attached to its bottom surface. This magnet may be any size or shape. As shown in the embodiment of FIG. 3C, the magnet is a circular, flat disc. This flat disc pairs with the flat outer surface 103 of FIGS. 2A and 2B. Alternatively, the outer surface 103 may have grooves formed therein. The magnet 106 of the cable fastener 105 may have a corresponding tongue designed to align with the grooves of the outer surface. Thus, the user may use a tongue and groove system to know where to place the cable fasteners on the cable organizer 100.

Figure 4A:
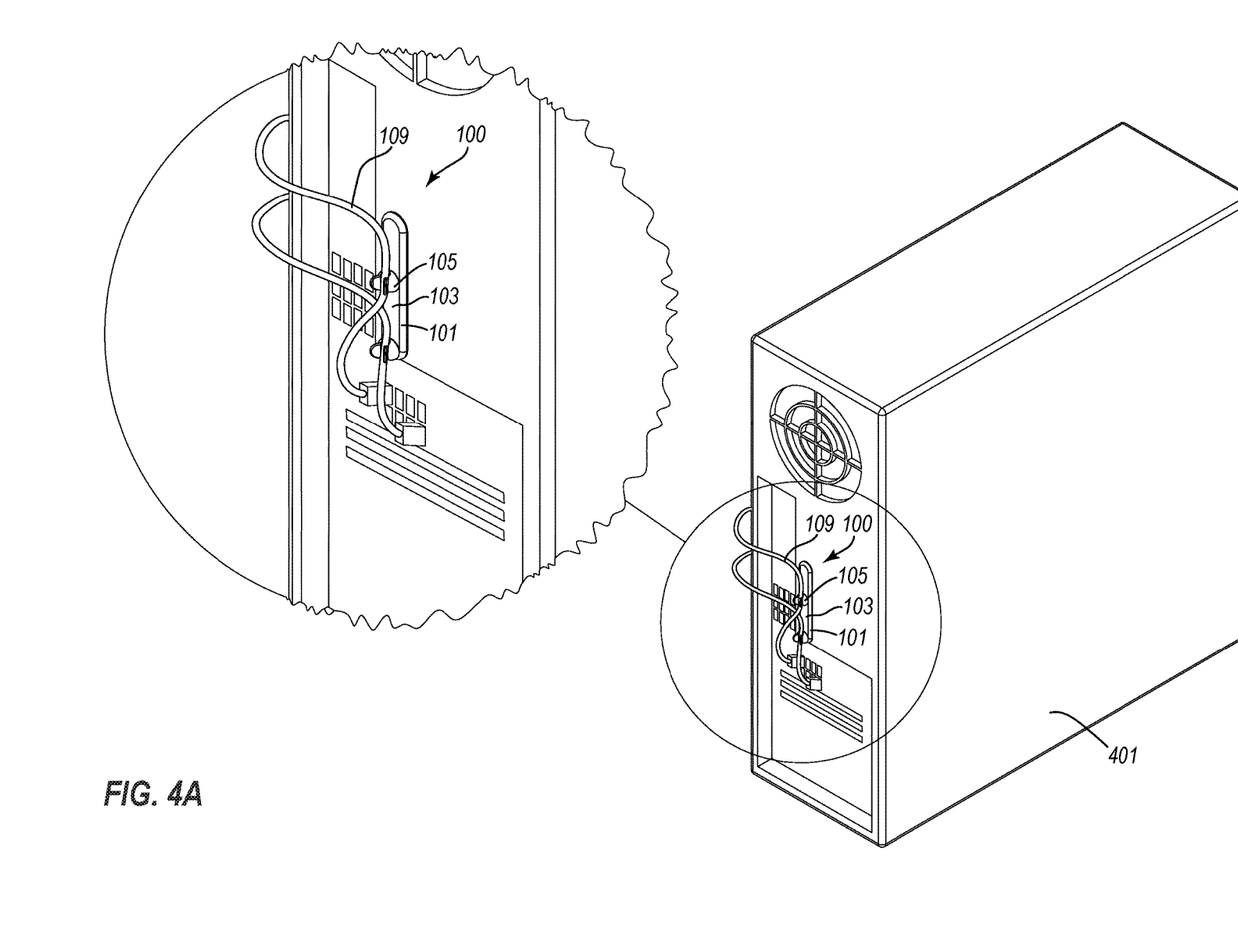
FIG. 4A illustrates the cable organizing apparatus with cable fasteners, where the base is attached to an electronic device.
Figure 4B:
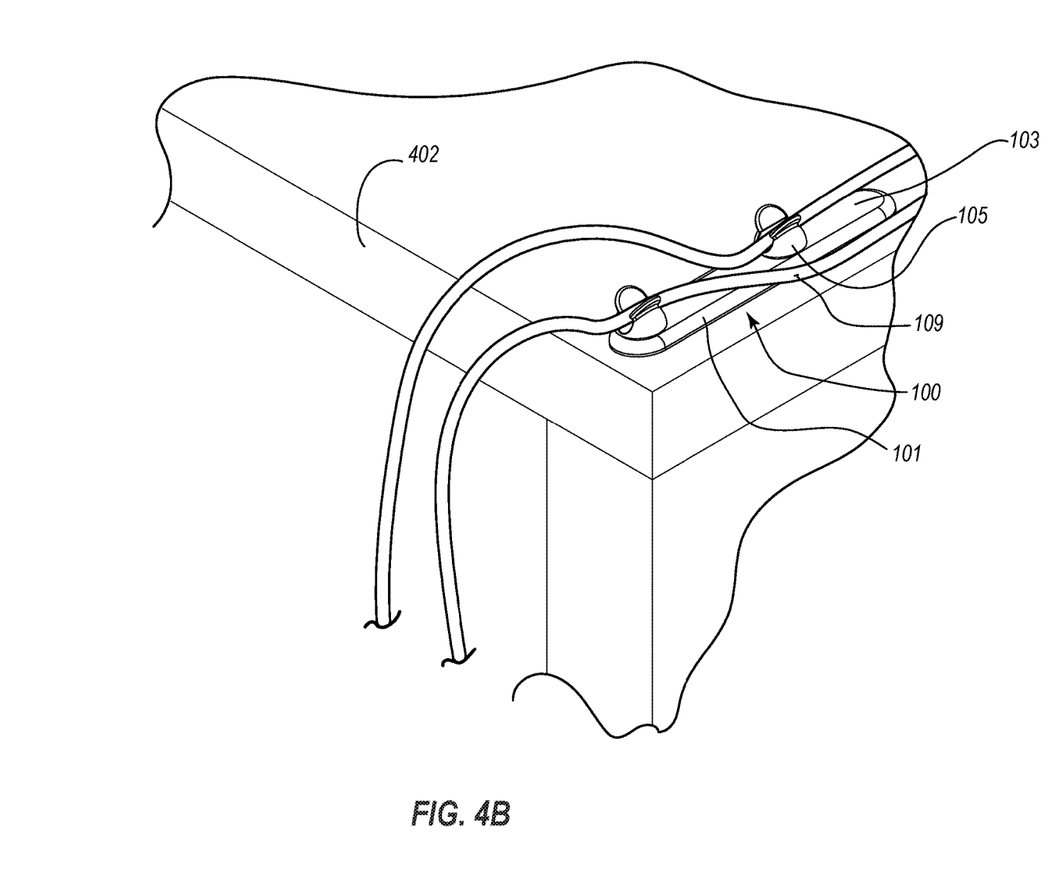
FIG. 4B illustrates the cable organizing apparatus with cable fasteners, where the base is attached to a table or desk.

The cable fasteners 105A and 105B may be of different sizes, or they may be the same size. In some cases, different sized cable fasteners may be used for different cables (e.g. to hold thicker or thinner cables). Larger cable fasteners may be used to hold multiple cables simultaneously. Each cable fastener 105 includes a channel 107 through which the cables are routed (as generally shown in FIGS. 4A and 4B). The cable fastener 105 also includes guides 108 that serve to guide the cables or cords into place within the channel 107.

The guides 108 (or "clips" herein) also allow users to open the channel 107 wider by pushing the guides apart. The guides may be made of plastic, silicone, rubber, metal or other materials. The top view in FIG. 3B illustrates the channel 107 and guides 108, while the bottom view in FIG. 3C shows the magnet 106 or other attaching means (e.g. glue, tape or other adhesive). FIG. 3D illustrates a side view of the cable fastener 105, highlighting the channel 107 that runs therethrough.

The magnet itself (106) may be bonded to the cable fastener 105 in a firmly affixed manner, or may be linked via a swivel or hinge. For example, the magnet 106 may be attached to the cable fastener 105 via a swivel linkage that allows the cable fastener to spin 360 degrees in either direction. Such a connection would hold the cable fastener tightly to the outer surface 103 of the cable organizer 100, but would allow the fastener to change the orientation of the channel 107 to substantially any direction. Thus, if a cable near one part of the cable organizer 100 needed to travel in a north-south direction, the cable fastener 105 could rotate to align in that direction. If a cable in another part of the cable organizer 100 needed to travel in an east-west or northeast-southwest direction, for example, the cable fastener could be rotated to accommodate that cable. The magnet 106 in the cable fastener may turn freely, or may turn only under a substantial amount of pressure, such that once rotated into a desired position, the cable fastener will stay in that position.

Although two cable fasteners are shown in FIGS. 2A and 2B (105A and 105B), it will be understood that substantially any number of cable fasteners may be used. This is especially true in cases where the cable organizing apparatus 100 is much larger than that shown in FIG. 4A. In some cases, for example, the cable organizer 100 may be a rectangle roughly the size of a postcard. In such cases, 10-15 or more cable organizers may be placed thereon. As in the examples above, in this case the cable organizer may include a single magnet on the outer surface 103, or may include multiple magnets in different positions. Similarly, the inner surface 102 may include a magnet that spans the inner surface of the support structure 101, or may include multiple different magnets in different positions.

FIG. 4A illustrates one example of an object to which the cable organizer 100 may be attached. For instance, the cable organizer 100 may be attached to a personal computer 401. The cable organizer 100 may include one or more magnets on the inner surface 102 which affix the cable organizer to the ferrous metal of the computer case. Two cables are shown (109). As can be seen, the cables are inserted into ports on the computer system (e.g. USB ports), and are routed away and held in place in a specified direction. As noted in FIGS. 2A and 2B, the cable fasteners 105A and 105B may be moved to different positions along the outer surface 103 to move the cables to better positions. For instance, in a crowded area, cables may be moved upwards or downwards so as to be positioned away from other cables in that area.

FIG. 4B illustrates another example of an object to which the cable organizer 100 may be attached. As shown in FIG. 4B, the cable organizer 100 is attached to a desk or table. Users who often use such a table or desk may fasten the cable organizer to a fixed position (using an adhesive, screw, nail or other fastener). Cables 109 may then be routed through the clips 105. The cable heads (e.g. a USB cable head or a power cable head) will naturally catch on the clips 105, preventing the cables from falling to the ground. When a user needs a cable for his or her electronic device, the user can simply reach for the cable organizer 100 where the cable heads are held in place, and pull the cable through the channels 107 and attach the cable to the device. When the user is finished with the cable (e.g. after the device is charged), the user can simply release the cable and the clip will prevent it from falling off the desk and out of reach. As will be appreciated, the cable organizer 100 may be fastened to all sorts of different objects, as desired by the user.

Figure 5A:
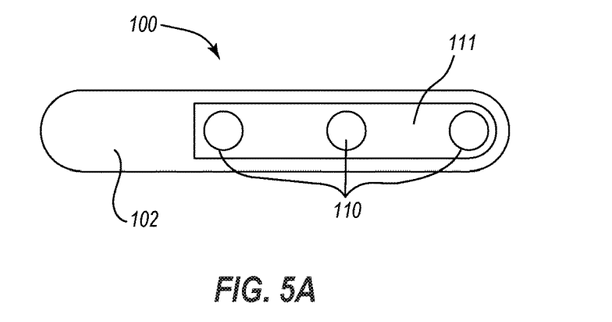
FIG. 5A illustrates a bottom view of the base with a large cavity and magnets inside the cavity.

FIGS. 5A-5D illustrate embodiments in which cable fasteners mount to the outer surface 103 at fixed positions. Indeed, FIG. 5A illustrates a bottom view of a cable organizer 100. In this embodiment, the cable organizer 100 includes a cavity 111 that is designed to hold one or more different magnets 110. The cavity 111 may be substantially any shape or depth. Although three magnets 110 are shown, it will be understood that substantially any number may be used. The cable fastener 105 may attach to the outer surface 103 of the cable organizer 100 at any one of the positions where the magnets are mounted. Thus, instead of having a single long magnet that spans the length of the cable organizer 100, individual discrete magnets may be placed at different positions in the support structure 101. Then, users can mount cable fasteners at these positions along the outer surface 103.

Figure 5B:
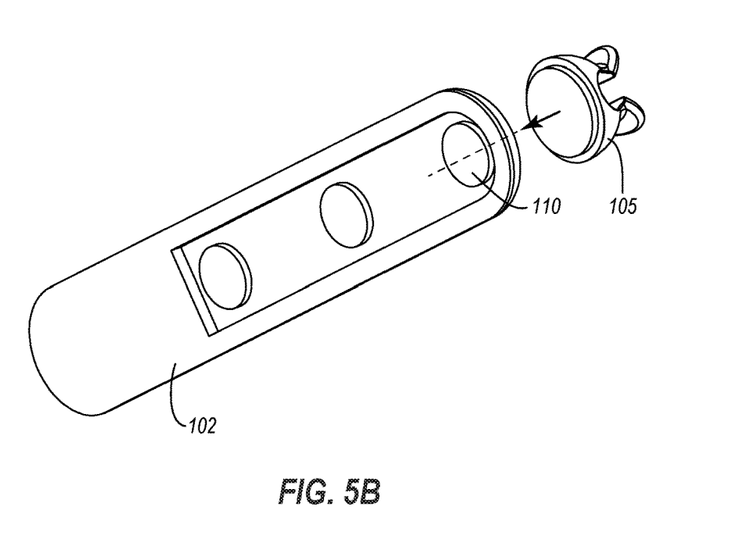
FIG. 5B illustrates a bottom perspective view of the cable organizing apparatus that shows a cable fastener being attached where one of the magnets is located.
Figure 5C:
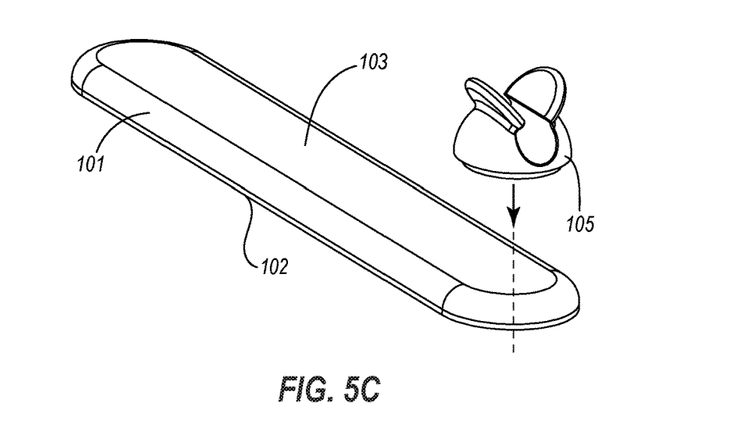
FIG. 5C illustrates a top perspective view of the cable organizing apparatus that shows a cable fastener being attached where one of the magnets is located.
Figure 5D:
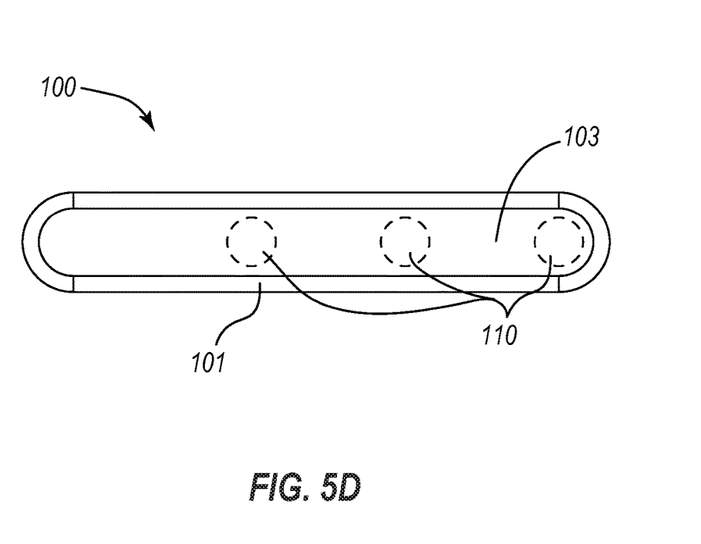
FIG. 5D illustrates a top view of the of the cable organizing apparatus.

FIGS. 5B and 5C illustrate how the cable fastener aligns with the magnet 110 to hold the cable fastener in a given position. FIG. 5D illustrates a top view showing where the magnets 110 are placed within the cavity 111, as represented by dotted-line circles representing outlines of the magnets. In some cases, the locations of the magnets 110 may be marked on the outer surface of the cable organizer 100, while in other cases, they are not marked. In cases where the magnet locations are marked, the locations may be printed on the outer surface 103 using a specialized printer.

For instance, if the outer surface is made of plastic (e.g. Acrylonitrile Butadiene Styrene (ABS) or polypropylene carbonate (PPC)), or silicone or some other printable material, a printer may apply a circle, an "X," a logo, a word or other symbol wherever a magnet is placed in the cavity 111. Thus, users would be able to look at the marks and identify where the magnets had been placed within the cavity 111. In some cases, users may be able to order customized cable organizers that have magnets placed in specified locations in the cavity 111, and have specified words, pictures or symbols printed over the location of each magnet.

Thus, the support structure 101 may include one or more cavities 111 that are each designed to store magnets or other attaching means. The magnets in the cavities of the support structure attach to magnets that are part of the cable fasteners 105. In a manufacturing process, the magnets in the cavities 111 may be placed into those cavities before printing takes place on the outer surface 103 of the support structure 101. Thus, for example, in FIG. 5A, magnets 110 may be placed in the cavity 111 before anything is printed on the outer surface 103 of the cable organizer 100. As noted above, the outer surface 103 may be made of silicone or plastics, including PPC or ABS.

Additionally or alternatively, each magnet 110 may have its own cavity within the larger cavity 111. Indeed, each magnet may have its own specially shaped cavity designed specifically to fit that magnet. Each of these sub-cavities may be drilled into or carved into the main cavity 111 of the support structure 101. In this manner, cavities and sub-cavities may be provided as needed in the support structure 101 to accommodate different shapes and orientations of magnets. These magnets may be placed in their corresponding cavities after printing on the outer surface 103 has been performed.

Figure 6:
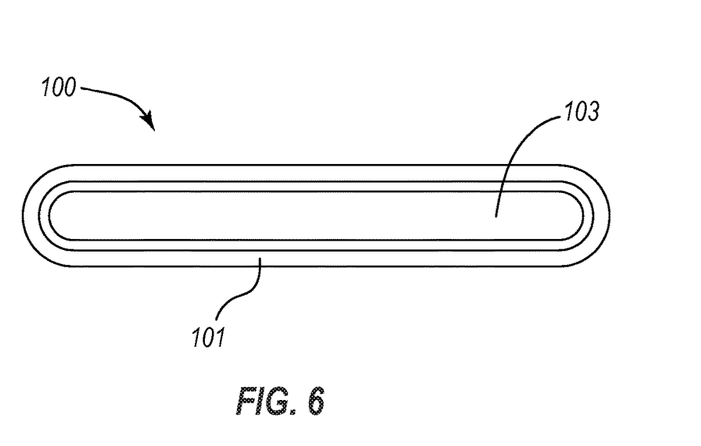
FIG. 6 illustrates a top view where a single magnet runs the length of the outer surface of the cable organizing apparatus.

In some embodiments, the cable organizer 100 may have a single magnet on its outer surface 103 that runs the length of the support structure 101. For example, as shown in FIG. 6, the outer surface 103 is itself a long magnet. In this manner, substantially the entire outer surface 103 is a magnet that fastens the cable fasteners to the support structure 101. The magnet may be broken up into different pieces or sections, or may span the entire outer surface of the support structure. Cable fasteners may attach anywhere a magnet is present, including anywhere along the outer surface of the embodiment shown in FIG. 6. Once attached, the cable fasteners may be detached from the outer surface and repositioned to a new location or to a different cable organizer.

Figure 7:
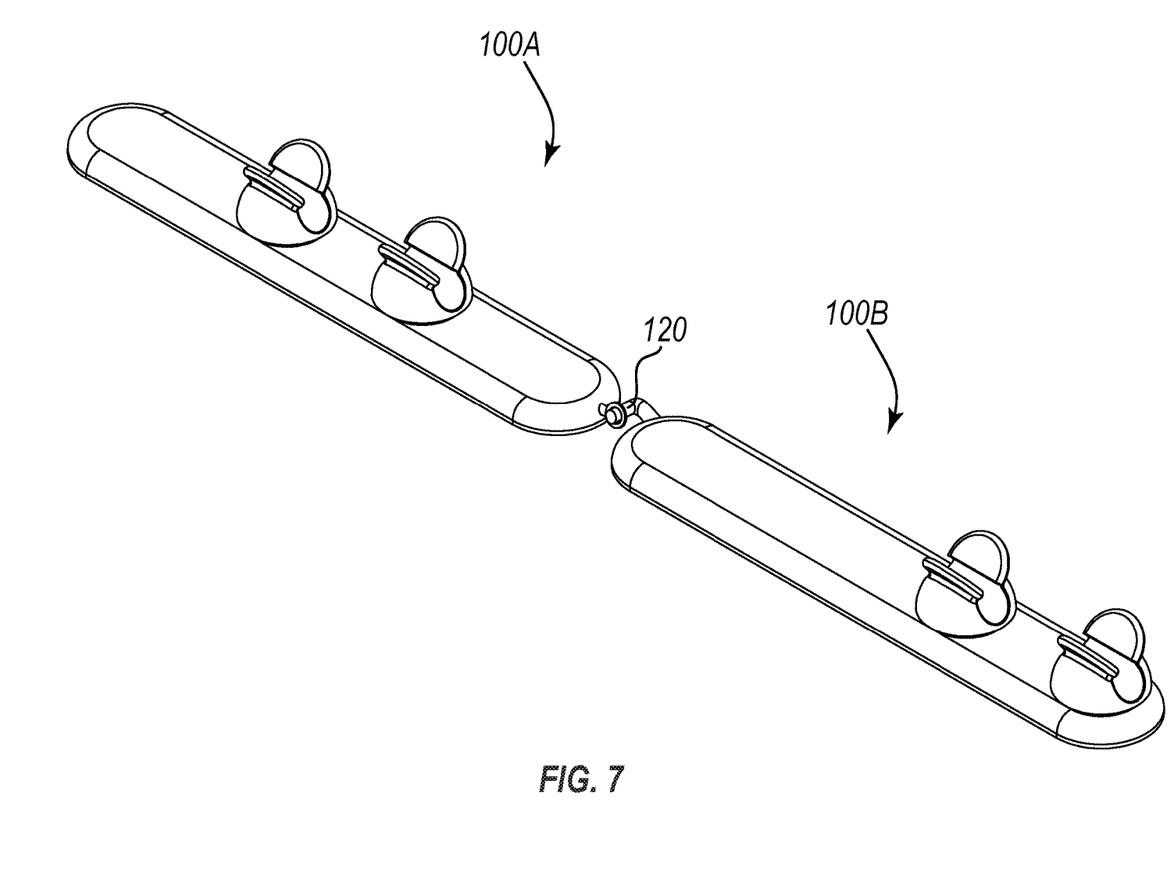
FIG. 7 illustrates two bases, each with cable fasteners, where the bases are linked together via a linking mechanism.

Cable organizers may be used as individual units, or may be linked to other cable organizers. For instance, in FIG. 7, two cable organizers 100A and 100B are linked together via a linking mechanism 120. The linking mechanism 120 may be any type of fixed, hinged or moveable mechanical connecting piece. In some cases, the linking mechanism 120 may be a magnet attaching to a ferrous metal or to an oppositely charged magnet. The linking mechanism 120 may allow the two cable organizers to move to different positions relative to each other. Thus, one cable organizer (e.g. 100A) may be placed in a substantially horizontal position, while the linked cable organizer 100B may be place in a substantially vertical position relative to the object to which they are attached. Although two cable organizers are shown as being linked together, one skilled in the art will recognize that substantially any number of cable organizers may be linked together. Moreover, one will recognize that the organizers may be linked at the ends, or may be linked in the middle or other location on the support structure 101.

In another embodiment, a cable organizing system is provided. The cable organizing system (e.g. 100 of FIG. 1) includes a base 102 that is attachable to an object (e.g. 401 of FIG. 4A). The cable organizing system also includes a shell structure 101 that is fastened to the base 102. The shell structure has mounting points (e.g. 103 of FIG. 6) at which clips (e.g. 105 of FIG. 5B) are mounted to the shell structure. The cable organizing system further includes one or more clips configured to route cables (e.g. 109 of FIG. 4A) positioned in the object's vicinity. The clips are detachably mounted to at least one of the mounting points of the shell structure. The mounting points of the shell structure 101 may be magnets 110 that are embedded in the shell structure.

The mounting points of the shell structure may be the entire outer surface, or certain sections of the outer surface. These sections may include magnets, or perhaps an adhesive or semi-adhesive to hold the clips in place on the shell structure. The outer surface and/or the clips may be made of or covered with a specified material. For example, the outer surface may be made of or covered with soft silicone, soft ABS, rubber or other material that allows the clips to close and fit over cables.

Figure 8A:
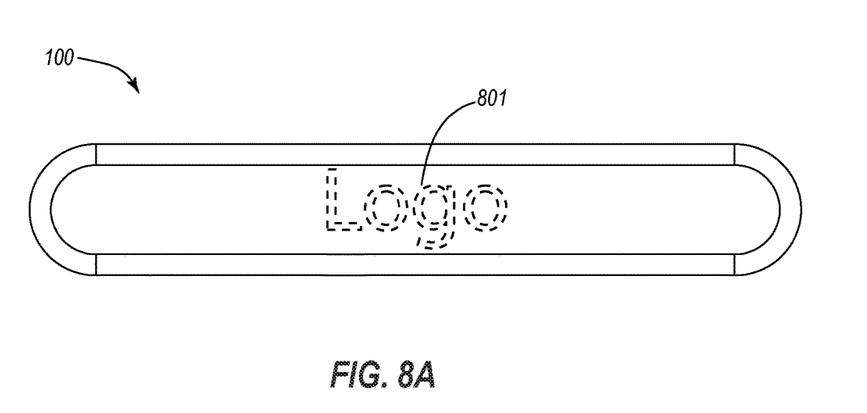
FIG. 8A illustrates a front perspective view of a cable organizing apparatus with a logo printed on the outer surface.
Figure 8B:
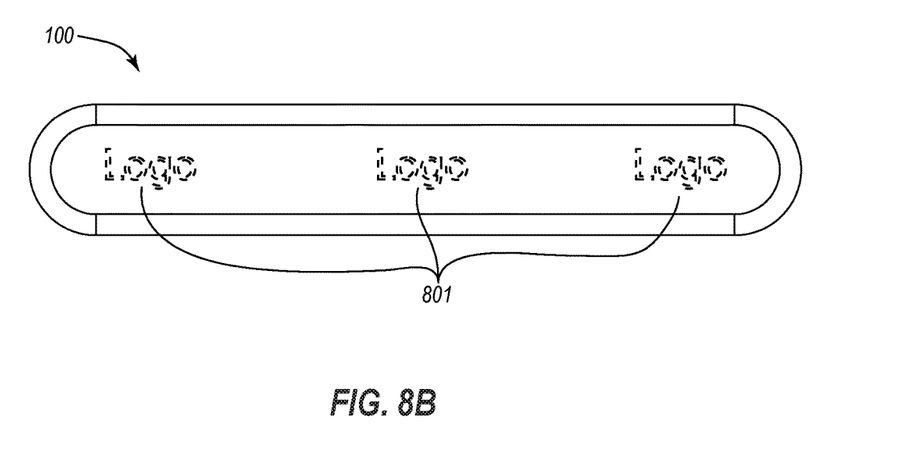
FIG. 8B illustrates a front perspective view of a cable organizing apparatus with logos printed on different magnet locations.

In some cases, the outer surface may be covered with or made of materials that are printable by a printing device. Thus, as shown in FIG. 8A, a manufacturer or distribution company may print a logo 801 on the outer surface of the cable organizer 100. The logo may be substantially any size, shape or color, and may be printed on all of the outer surface, or just parts of the outer surface. For instance, as shown in FIG. 8B, logos 801 may be printed on cable fastener mounting points. In such cases, the user would know where to place the cable fasteners, as each goes over a logo 801. Alternatively, the logos may be printed between cable fastener mounting points, and the user would know (or learn) to position the cable fasteners between the logos. Because the logos or other designs may be printed on the outer surface, purchasers are free to design their own image, logo or phrase and print it on the cable organizer's outer surface.

Figure 9:
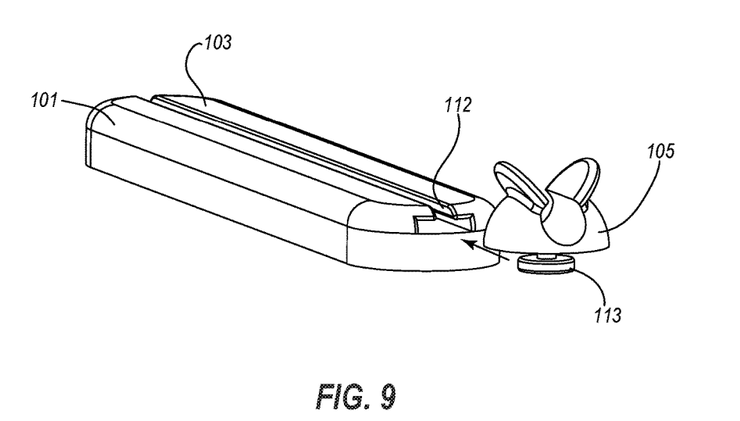
FIG. 9 illustrates a front perspective view of a cable organizing apparatus with a tongue and groove system for locking the cable fastener in place.

The cable organizer's outer surface may be flat (as shown in FIG. 1D, for example), or may be round, bowed, indented or shaped in another manner. FIG. 9 illustrates an embodiment where the outer surface 103 of the support structure 101 has a notch or groove 112 formed therein. In such cases, the cable fasteners 105 may have a corresponding tongue 113 that fits in the groove 112. This tongue and groove system may force an alignment of the cable fastener 105 in one direction. For example, if the groove 112 is a horizontal groove, the tongue 113 of the cable fastener would align in a horizontal manner. Alternatively, if the groove 112 was a vertical groove, the tongue 113 would align in a vertical manner relative to the support structure 101. A single cable organizer may have multiple grooves in different locations and in different orientations to accommodate cable fastener locations and orientations.

In some cases, the groove locations may be swivel mounted within the support structure, such that when fastened to the groove, the cable fasteners can rotate freely. Alternatively, the cable fasteners themselves may have swivel-mounted bases that allow the upper clip portion of the fasteners to move relative to the fixed base. In still other embodiments, the cable organizer 100 may have a swivel magnet mounted to its inner surface 102. The swivel magnet would allow the cable organizer 100 to be detachably mounted to objects, such as electronic devices, and would further allow the entire support structure 101 of the cable organizer to be rotated in any direction.

Thus, in such embodiments, the cable organizer itself may swivel on a swivel mount, and may have cable fasteners that also swivel on a swivel base. Such embodiments would provide a very high degree of flexibility in positioning and orienting the cable organizer and the cable fasteners. Users may be able to push a button or depress the cable organizer or the cable fasteners in a certain manner that locks the orientation of the organizer or the fasters. Thus, when the user finds an optimal position for the cable organizer and/or each cable fastener, he or she can lock the organizer and/or fasteners in place for a more permanent (yet still changeable) solution.

Accordingly, systems and apparatuses are provided which allow users to organize cables and cords that are attached to stationary or mobile computing devices or peripherals. Different embodiments allow for printing and customization on the surface of the cable organizers. Still further, embodiments allow placement of the cable fasteners in a variety of different locations and orientations.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A cable organizing apparatus, comprising:
a support structure including an inner surface that is attachable to a specified object, and an outer surface having one or more mounting points at which cable fasteners are mounted to the support structure; and one or more cable fasteners configured to hold cables in a specified position, wherein the cable fasteners mount to the outer surface of the support structure, the one or more cable fasteners including at least one clip and at least one attaching means for attaching the cable fasteners to the support structure;

wherein:

the outer surface is flat, such that the cable fasteners are slideable along the outer surface, the cable fasteners attach to the outer surface via magnets, and the support structure includes one or more cavities that are each designed to store one or more magnets such that the one or more magnets are embedded in the support structure.

2. The cable organizing apparatus of claim 1, wherein the inner surface of the support structure includes at least one magnet that attaches the support structure to the specified object.

3. The cable organizing apparatus of claim 2, wherein the magnet spans the inner surface of the support structure.

4. The cable organizing apparatus of claim 1, wherein the outer surface includes at least one magnet that fastens at least one of the cable fasteners to the support structure.

5. The cable organizing apparatus of claim 4, wherein the magnet spans the outer surface of the support structure.

6. The cable organizing apparatus of claim 1, wherein the cable fasteners are detachable from the outer surface.

7. The cable organizing apparatus of claim 1, wherein the one or more cavities correlate with the one or more mounting points.

8. The cable organizing apparatus of claim 1, wherein the magnets in the one or more cavities of the support structure attach to one or more magnets that are part of the cable fasteners.

9. The cable organizing apparatus of claim 1, wherein the magnets in the one or more cavities are placed in the cavities before printing on the outer surface of the support structure.

10. The cable organizing apparatus of claim 1, wherein the magnets in the one or more cavities are placed in the cavities after printing on the outer surface of the support structure.

11. The cable organizing apparatus of claim 1, wherein the outer surface is made of a printable material.

12. A cable organizing system, comprising:

a base that is attachable to an object;

a shell structure that is fastened to the base, the shell structure having one or more mounting points at which clips are mounted to the shell structure; and one or more clips configured to route cables positioned in the object's vicinity, wherein the clips are detachably mounted to at least one of the mounting points of the shell structure;

wherein:

the one or more mounting points comprise one or more grooves, and the one or more clips each comprise a tongue that is configured to fit into the one or more grooves of the one or more mounting points.

13. The cable organizing system of claim 12, wherein:

the mounting points of the shell structure include one or more magnets embedded in the shell structure; and the one or more clips each comprise a magnet.

14. The cable organizing system of claim 12, wherein the mounting points of the shell structure include an adhesive or semi-adhesive to hold the clips in place on the shell structure.

15. The cable organizing system of claim 12, wherein one or more of the clips are covered in a printable material.

16. The cable organizing system of claim 12, wherein the base is configured to attach to a mobile electronic device.

17. A cable organizing apparatus, comprising:

a support structure including an inner surface that is attachable to a specified object, and an outer surface having one or more mounting points at which cable fasteners are mounted to the support structure; and one or more cable fasteners configured to hold cables in a specified position, wherein the cable fasteners mount to the outer surface of the support structure, the one or more cable fasteners including at least one clip and at least one attaching means for attaching the cable fasteners to the support structure;

wherein:

the outer surface is flat, such that the one of more cable fasteners are slideable along the outer surface, the cable fasteners attach to the outer surface via magnets at the one or more mounting points, the support structure includes one or more cavities that are each designed to store one or more magnets such that the one or more magnets are embedded in the support structure, and the one or more cavities correlate with the one or more mounting points.

18. The cable organizing apparatus of claim 17, wherein the one or more cavities of the support structure are embedded within another, larger cavity in the support structure.

19. The cable organizing apparatus of claim 17, wherein a plurality of cable organizing apparatuses are linked together via a linking mechanism.

20. The cable organizing apparatus of claim 1, wherein:

the cable fasteners each comprise a first magnet, and the cable fasteners rotate relative to the first magnet; and the first magnet detachably attaches to the support structure at one of the one or more mounting points.

21. The cable organizing system of claim 12, wherein:

the one or more clips each comprise a first magnet, and the one or more clips rotate relative to the first magnet; and the first magnet detachably attaches to the support structure at one of the one or more mounting points.

22. The cable organizing apparatus of claim 17, wherein:

the one or more cable fasteners each comprise a first magnet, and the one or more cable fasteners rotate relative to the first magnet; and the first magnet detachably attaches to the support structure at one of the one or more mounting points.

* * * * *